United States Patent Office 3,137,630
Patented June 16, 1964

3,137,630
PROCESS FOR PREPARING A DRY, FINELY DIVIDED, GELATIN PARTICLE PRODUCT
John C. Hecker and Orris D. Hawks, Rochester, N.Y., assignors to Eastman Kodak Company, Rochester, N.Y., a corporation of New Jersey
No Drawing. Filed June 9, 1961, Ser. No. 115,929
23 Claims. (Cl. 167—81)

This invention relates to the preparation of dry, finely divided, gelatin particle products.

Dry, finely divided, gelatin particles products, particularly those containing a water-insoluble medicinal, such as, for example, a fat-soluble vitamin-active component, have been known for some time. A number of processes for making these products have been disclosed heretofore.

One such process is described in the U.S. Patent No. 1,201,133, to Askenasy. As disclosed this process comprises preparing an aqueous solution of gelatin either alone or in mixture with other substances (food preparations or medicines being specifically mentioned) as such or in the form of emulsions or solutions. The gelatin solution is then formed into liquid globules or drops and introduced into a liquid, hereinafter referred to as the congealing liquid, which does not dissolve gelatin and which is at a temperature generally cooler than the solution, preferably below the congealing temperature of the gelatin. The drops of solution upon contacting the congealing liquid congeal or gel and at least surface solid particles of gelatinous material result. The solid particles settle to the bottom of the congealing liquid and are removed therefrom as by way of a filter. Residual, adherent, congealing liquid is removed from the solid particles as by vacuum evaporation. Water is removed from the moisture ladened particles by vacuum evaporation, by drying the particles in a stream of dry air or in any other convenient way.

Present day practical considerations, especially when finely divided, fat-soluble vitamin-active, gelatin particles are involved, make air drying a preferred procedure for drying the gelatin particles or beadlets as they sometimes are called. However, air drying of finely divided, moisture ladened, gelatin particles, especially air drying by passing dry air through a bed of the particles, creates a problem. At high moisture concentrations, as moisture leaves the moisture ladened gelatin particles, they are tacky. During this tacky stage as the particles come into contact, they tend to stick to one another and form clumps or agglomerate. Not only does this agglomeration effect tend to increase the average particle size of the ultimate particles which make up the end product, but it also creates difficulties in achieving an end product sufficiently free of moisture to be commercially acceptable or satisfactory.

Hence, the problem is how to prevent finely divided, moisture ladened, gelatin particles from agglomerating under air drying conditions.

This problem has received a fair amount of attention in the art. A number of suggestions either for solving the problem or for avoiding the problem have been made and adopted with some success. However, none have been entirely satisfactory for a variety of reasons. Consequently, there is room for improvement.

A broad object of this invention is to provide such an improvement.

A general object of this invention is to provide a practical solution to this agglomeration problem.

A specific object of this invention is to provide a process wherein moisture ladened, finely divided, solid gelatin particles are formed, which do not agglomerate upon being air dried and especially upon being air dried by passing dry air through a bed of the particles.

A particular object of this invention is to so improve the Askenasy process that agglomeration of moisture ladened finely divided, solid gelatin particles or beadlets does not occur upon being subjected to air drying procedures.

These and other objects are achieved by this invention which is based on a concept of mixing the moisture ladened, finely divided, solid, gelatin particles in the congealing liquid with a finer finely divided, solid, anti-agglomeration agent before separating the moisture ladened gelatin particles from the congealing liquid. This results in the finer finely divided, solid, anti-agglomerating agent being efficiently, thoroughly, and uniformly distributed about each gelatin particle in the congealing liquid and each gelatin particle receiving sufficient contact with the finer solid, anti-agglomeration agent particles. Consequently, substantially all gelatin particles in the congealing liquid acquire in the liquid a protective coating of the finer anti-agglomerating agent particles. Upon separating the coated, moisture ladened gelatin particles from the congealing liquid and subjecting the particles to an air drying procedure, the protective coating of solid, finer finely divided anti-agglomerating agent minimizes agglomeration of the gelatin particles while they lose moisture.

Broadly, therefore, this invention involves a process for making dry, free-flowing, finely divided, solid, gelatin particles, wherein moisture ladened, finely divided, solid, gelatin particles are formed in a congealing liquid, separated from the congealing liquid and then air dried. The improvement of this invention resides in mixing the moisture ladened, finely divided, solid, gelatin particles in the congealing liquid with a finer finely divided, solid, anti-agglomerating agent before separating the moisture ladened gelatin particles from the congealing liquid.

More specific aspects of this invention include a process generally comprising the steps of (1) preparing a warm aqueous solution of gelatin, (2) forming the solution into droplets, (3) introducing said droplets into a cold slurry consisting essentially of a congealing liquid, whereby said droplets gel and form moisture ladened, finely divided, solid, gelatin particles or beadlets, and a finer finely divided, solid, anti-agglomerating agent, (4) mixing said gelatin particles with said slurry, (5) separating gelatin particles from the congealing liquid and (6) air drying the separated gelatin particles.

This invention in its more specific aspects comprises a process for making dry, free flowing, finely divided, solid, gelatin particles containing a water-insoluble medicinal. In still more specific aspects of this invention this medicinal is a fat-soluble vitamin-active composition. In these aspects of the process the first step of the process comprises the preparation of a warm aqueous solution of gelatin with the medicinal dispersed therein while the second step comprises forming into droplets the warm gelatin solution with the medicinal dispersed therein. The remaining steps of the process are generally as described in the preceding paragraph.

The first step of the process of this invention in its broad as well as more specific aspects is conventional and well understood by those in the exercise of ordinary skill in the art.

In its general aspects this first step is carried out by admixing gelatin with water at a temperature in a range from about 20° C. to about 100° C. until the gelatin appears to be completely dissolved in the water. The gelatin preferably has a Bloom strength rating from about 40 to about 290. Gelatin concentration in the solution is such that samples of the solution at 45° C. have a Brookfield viscometer viscosity in a range from about 100 to about 500 centipoises. Generally a gelatin concentration in a range from about 15% to about 25% by weight of the solution provides the solution with the desired consistency. In addition to water and gelatin the solution can also comprise an edible plasticizer such as glucose, sucrose and the like. In general the concentration of the plasticizer is in a range from about 10% to about 20% by weight of the solution.

In its more specific aspects the first step is carried out by making up the warm aqueous gelatin solution as in the more general aspects of this step and then dispersing in the aqueous solution a water-insoluble fat-soluble vitamin-active composition. This fat-soluble vitamin-active composition comprises at least one fat-soluble vitamin-active compound. More than one fat-soluble vitamin-active compound may be included. Representative of the fat-soluble vitamin-active compounds are the vitamin A compounds such as, for example, vitamin A acetate, vitamin A palmitate, vitamin A aldehyde, vitamin A alcohol, vitamin A acid and the like, the vitamin E compounds such as, for example, the $\alpha$, $\beta$, etc. forms of tocopherol, tocopheryl acetate, tocopheryl succinate and the like, and the vitamin D compounds such as, for example, vitamin $D_2$, vitamin $D_3$ and the like and the vitamin K compounds such as, for example, vitamin $K_1$, vitamin $K_2$ and the like. In addition to at least one fat-soluble vitamin-active compound the fat-soluble vitamin-active composition preferably comprises also an antioxidant component which can involve one or more antioxidants, such as, for example, butylated hydroxyanisole, butylated hydroxytoluene, propyl gallate, tocopherol and the like. The fat-soluble vitamin-active composition can also contain other ingredients such as, for example, an oily solvent, such as, for example, edible tallow, dispersing agents and the like. The dispersing of the fat-soluble, vitamin-active composition in the warm aqueous solution of gelatin is preferably effected by admixing under conditions of vigorous agitation until the desired degree of dispersion has been achieved. In this regard, the dispersed fat-soluble vitamin-active composition should have a maximum particle (solid or liquid as the case may be) size less than about 15 microns and preferably less than about 8 microns. Hence, if a fat-soluble vitamin-active compound in the composition is in solid form it should either be in such a finely divided condition as to meet these particle size recommendations, or melted or dissolved in an oily solvent (such as melted, edible tallow, for example) before being added to the aqueous solution of gelatin.

The second step of the process of this invention, forming the gelatin solution into droplets, is performed preferably by spraying or "atomizing" the solution as by, for example, ejecting the solution under hydrostatic pressure from a constricted orifice, such as furnished, for example, by a standard spray nozzle, preferably from a plurality of constricted orifices, such as furnished, for example, by a textile spinnerette. The orifice or each orifice as the case may be has, for example, an effective diameter in the range from about 0.001 inch to about 0.007 inch. Preferably the solution is atomized in a downward direction. Under such conditions discrete droplet development becomes apparent at a distance in a range from about 12 to about 36 inches from the outlet side of the constricted orifice depending on the orifice diameter involved.

The third step of the process of this invention involves introducing the droplets of warm gelatin solution into a cold slurry consisting essentially of a congealing liquid and a finely divided, solid, anti-agglomerating agent. Preferably the slurry is contained in a mixing tank with the top surface of the slurry located below the atomizing means in position to receive the droplets in their downward travel. In the case of a spray nozzle and the like having a constricted orifice of effective diameter in the aforementioned range the top surface of the slurry should be located at least below the level at which discrete droplet development is apparent.

The congealing liquid is any suitable liquid in which gelatin is insoluble and which is inert under the conditions of this invention. Generally, nonpolar liquids are suitable liquids. A preferred nonpolar liquid is a low boiling hydrocarbon with a specific gravity less than that of the gelatin droplets. Nonpolar liquids with specific gravities greater than that of the gelatin droplets such as, for example, chloroform and carbon tetrachloride, can be used but they are not preferred because they tend to float the solid gelatin particles and because they tend to cause gelatin droplets to coalesce upon impact of the droplets therewith and thereby to cause the average particle size of the gelatin particles to be greater. A satisfactory nonpolar liquid for use as a congealing liquid is hexane. Other satisfactory nonpolar liquids which can be used as the congealing liquid are benzene, toluene, xylene, heptane, isoheptane and higher boiling naphthas such as Stoddard solvent.

The quantity of congealing liquid in the cold slurry in which the droplets of gelatin solution are introduced can vary over a wide range. In general when operating on a batch basis the quantity should be sufficient to completely cover the entire batch of gelatin particles. The maximum quantity is governed for the most part by practical considerations such as economics, mixing tank size and the like. A satisfactory weight ratio of congealing liquid to gelatin solution, in the case of hexane as the congealing liquid, is about 5:1. Satisfactory ratios of 20:1 have also been used under continuous spraying and filtering conditions.

The anti-agglomerating agent is a finely divided, free flowing solid inert under the conditions of this invention. Its primary function is to establish and maintain moisture ladened gelatin particles in a discrete, disseminated or unagglomerated condition while they are being air dried. Under some circumstances when the concentration of gelatin particles in the congealing liquid is rather high the anti-agglomerating agent also functions to establish and maintain the moisture ladened gelatin particles in a discrete, disseminated or unagglomered condition in the liquid. The anti-agglomerating agent which remains in the end product after air drying helps to make the end product free flowing and to minimize scatter, a condition that can occur when relatively non-resilient particles are poured onto a hard surface and which it is desired to avoid. Examples of suitable anti-agglomerating agents are colloidal silica, silicon dioxide, colloidal calcium silicate, colloidal sodium alumino silicate, aerogel silicon dioxide,, corn starch, rice starch, modified starch such as that disclosed in the U.S. Patent, No. 2,613,206, to Caldwell and commercially sold as "Dry-Flo" starch, the mixtures of these solids, and the like.

Preferably, the average particle size of the anti-agglomerating agent is substantially less than the average particle size of the gelatin particles of the end product. In the preferred embodiments of this invention the average particle size of the gelatin particle products is usually less than about 18 mesh U.S. screen size, which is equivalent to about 1000 microns, and generally is about 30–80 mesh U.S. screen size, which is equivalent to about 180–590 microns. In these embodiments the solids which make up the anti-agglomerating agents are colloidal in size. An average particle size in the range from about 0.01 micron to 20 microns is employed. However, it is preferred that the average particle size of the anti-agglomerating agent be as small as possible in order to minimize the concentration of anti-agglomerating agent in the final product. In this regard the quantity of anti-agglomerating agent adhering to a gelatin particle in the final product increases as the particle size of the gelatin particle decreases. Hence, in the finer particle size screen fractions of the end product the concentration of anti-agglomerating agent of relatively large average particle size can be as much as 10–40 weight percent depending on the screen fraction involved. As a result, in the more specific aspects of this invention the medicinal or vitamin potency of the various screen fractions of the gelatin particle end product varies proportionately and is not uniform from one screen fraction to the next. Moreover, in these more specific aspects of this invention, due to the substantial quantity of anti-agglomerating agent of relatively large average particle size adhering to the gelatin particles which make up the finer particle size screen fractions of the end product, it is difficult to obtain high fat-soluble vitamin potencies in these finer particle size screen fractions. For these reasons anti-agglomerating agents of the finer average particle sizes (less than about 10 microns) are preferred. Hence, the corn starch (corn starch has an average particle size of about 20 microns) and modified corn starch are not preferred materials for this purpose. On the other hand, rice starch (average particle size is 8 microns), colloidal silica (average particle size is 3–10 microns), colloidal calcium silicate (average particle size is 0.5 micron), colloidal sodium alumino silicate (average particle size is 0.02 micron), aerogel silicon dioxide (average particle size is 0.01–3 microns) and the like are preferred anti-agglomerating agents for the process of this invention.

The concentration of anti-agglomerating agent in the cold slurry can also vary. However, it should be present at the minimum concentration.

The minimum concentration of anti-agglomerating agent in the slurry is generally that which is necessary to prevent substantially all of the gelatin particles formed in the slurry from adhering to each other when they are subjected to air drying. This in turn depends on the average particle size of the solid, gelatin particles formed in the slurry and the average particle size of the anti-agglomerating agent involved. As an aid in determining the minimum concentration of anti-agglomerating agent the following empirical equation can be used, to wit: $y=0.5x$, wherein $y$ represents the minimum concentration of anti-agglomerating agent in percent by weight of the gelatin solution to be formed into gelatin particles and has a numerical value greater than zero up to about 10, and $x$, representing the average particle size in microns of the anti-agglomerating agent, has a numerical value greater than 0 and up to about 20.

On the other hand, in actual practice, it is preferred that the slurry comprise an excess of the anti-clumping agent. Thus, in the case of colloidal silica, for example, which has an average particle size of 3–10 microns, the slurry preferably should have an anti-agglomerating agent concentration of approximately 2.6 percent by weight of the gelatin solution to be formed into solid particles having an average particle size in the range 30–80 mesh U.S. screen size. In the case of finer particles such as colloidal calcium silicate with an average particle size of 0.5 micron, sodium, alumino silicate having an average particle size of 0.02 micron and silicon dioxide having an average particle size of 0.01 micron, it is preferred that the slurry have an anti-agglomerating agent concentration of about 1 percent by weight of the gelatin solution. Large excesses of anti-agglomerating agent and particularly an anti-agglomerating agent of extremely fine particle size are to be avoided, however, because of the expense involved in unnecessary material and because of the increased expense in recovery of excess anti-agglomerating agent from the air drying step.

Temperature of the cold slurry can also vary as long as it is below the gelation temperature of the gelatin solution to be formed into gelatin particles. In general a temperature in the range from about 15° C. to about −25° C. is recommended.

During the introduction of the droplets of gelatin solution into the cold slurry the mixture of anti-agglomerating agent and congealing liquid is established and maintained in a state of agitation in order to establish and maintain the anti-agglomerating agent in suspension, to effect rapid heat exchange between the droplets and non-polar liquid and to minimize impact and agglomeration of the droplets and resulting solid gelatin particles in the slurry.

At this point it should be noted that the average particle size and the particle size distribution of the solid gelatin particles formed in the slurry are dependent on a number of factors. A primary factor is the effective diameter of the constricted orifice through which the warm gelatin solution is sprayed. Other factors are hydrostatic pressure of gelatin solution at the constricted orifice, consistency of the gelatin solution, temperature of the gelatin solution at the orifice, etc. Each of these factors within the limits or ranges disclosed herein can be readily determined for a gelatin particle product of desired average particle size and particle size distribution in light of the disclosures of this specification by a worker in the exercise of ordinary skill in the art.

The fourth step of the process of this invention, namely, that of separating the moisture ladened, finely divided, solid, gelatin particles from the congealing liquid, is accomplished by conventional ways and means, such as, for example, filtration. By using a filtration procedure all excess anti-agglomerating agent is usually separated from the congealing liquid and appears in the filter cake along with the solid gelatin particles.

The fifth step of the process of this invention is preferably performed by blowing dry air preferably through a bed of the moisture ladened, finely divided, solid, gelatin particles until the particles are essentially dry, that is, until the beadlets have a moisture content less than about 5% by weight. Under these conditions most of the excess anti-agglomerating agent adhering to the gelatin beadlets is blown away from the individual gelatin particles after sufficient moisture has been removed therefrom to lose their tackiness, and carried away with the drying air.

The product of this process is a mass of dry, finely divided, free flowing, solid, discrete, gelatin particles which in the more specific aspects of this invention have medicinal activity such as, for example, a fat-soluble vitamin activity.

This invention is further illustrated by the following examples of specific embodiments thereof. In this regard, the invention is not restricted to these embodiments unless otherwise indicated.

EXAMPLES 1–5

These examples illustrate the preparation according to this invention of dry, finely divided, free flowing, solid, discrete, vitamin A active, gelatin particle products. Each example involves a different anti-agglomerating agent. The specific components and quantities involved in these products and other pertinent specific conditions are indicated in the table which appears after the following description of the process practiced to prepare these products.

In each of these examples the gelatin particle product was prepared as follows.

The gelatin and the glucose were admixed with the water at 65° C. until all of the solids had dissolved. The vitamin A palmitate, edible tallow (only in Example 5), butylated hydroxyanisole and butylated hydroxytoluene were melted together and then admixed in a mixing tank with vigorous agitation at 65° C. with the aqueous solution of gelatin and glucose. An emulsion resulted. Mixing at 65° C. continued until the average oil droplet size was about 3–7 microns. The emulsion was then ready for spraying.

The emulsion was pumped from the mixing tank through a heat exchanger where the temperature was adjusted to the specified spray temperature. From the heat exchanger the emulsion was conducted through a filter for the removal of any orifice plugging materials which might be present. From the filter the emulsion was passed into a sprayer. The sprayer was a standard, circular, textile spinnerette having a 1.5 inch diameter cup face which was disposed to face downwardly into a mixing tank. The sprayer comprised 25 orifices in the cup face, each orifice being uniformly spaced and having the indicated effective diameter.

In the mixing tank was the indicated quantity of hexane and the indicated quantity of the specified anti-agglomerating agent. During operation of the sprayer the hexane and anti-agglomerating agent were established and maintained in a constant state of agitation whereby the anti-agglomerating agent was suspended in the hexane and a slurry was formed. The cup face of the nozzle was located so that the droplets formed from the jets of gelatin solution emitted from the orifices fell into the slurry. The distance of the cup face of the sprayer from the slurry was set as indicated. By means of cooling coils about the mixing tank, the indicated temperature of the slurry was established and maintained, whereby gelation of droplets occurred upon entering the slurry.

When all of the emulsion had been sprayed into the slurry, agitation of the slurry was stopped. The slurry was then filtered whereby hexane was separated from the solids. The filter cake, a mixture of anti-agglomerating agent and moist gelatin beadlets, was then blown with air at a temperature of 60° C. until the solid gelatin particles were dry. Samples of the beadlets were then subjected to screen analysis and vitamin potency tests. The results and details are set out in the following table.

curred in the absence of the anti-agglomerating agent. Hence, the presence of an anti-agglomerating agent has a beneficial effect.

The table demonstrates that various kinds of inert, colloidal solids can be employed as anti-agglomerating agents. However, the table also demonstrates that inert, colloidal solids of relatively large average particle size, such as corn starch, modified corn starch and the like, when employed as anti-agglomerating agents in this process, make up a substantial portion of the end product. Hence, inert, colloidal solids of average particle size less than about 10 microns are preferred anti-agglomerating agents.

EXAMPLE 6

This example illustrates the preparation of a dry, free flowing, finely divided, discrete, vitamin A active, solid, gelatin particle product, according to the process of this invention, the anti-agglomerating agent being colloidal silica or silicon dioxide which has an average particle size of about 3 microns.

37.7 grams of 125 Bloom acid pig gelatin and 20.9 grams of glucose were dissolved over a period of approximately a half hour in 110 milliliters of water at 65° C. A melted mixture of 15.6 grams of vitamin A palmitate (1,600,000 units per gram), 13.4 grams of edible tallow, 1.3 grams of butylated hydroxyanisole and 1.5 grams of Table

|  | Example 1 | Example 2 | Example 3 | Example 4 | Example 5 |
|---|---|---|---|---|---|
| Acid Pig Gelatin—grams | 418.0 | 313.5 | 313.5 | 313.5 | 225.1. |
| Bloom Strength | 55 | 90 | 55 | 55 | 55. |
| Glucose—grams | 233.0 | 174.8 | 174.8 | 174.8 | 126.0. |
| Water—milliliters | 1,200.0 | 900.0 | 600.0 | 600.0 | 390.0. |
| Vitamin A Palmitate—grams | 383.8 | 315.1 | 288.0 | 288.0 | 112.1. |
| Edible Tallow—grams |  |  |  |  | 80.8. |
| Butylated Hydroxyanisole—grams | 18.3 | 13.7 | 13.8 | 13.8 | 8.1. |
| Butylated Hydroxytoluene—grams | 16.5 | 12.5 | 12.5 | 12.5 | 9.3. |
| Concentration of Water in Emulsion—percent by weight | 58.6 | 52.1 | 42.6 | 42.6 | 40.5. |
| Brookfield Viscometer Viscosity of Emulsion at 45° C.—centipoises | 50 | 265 | 400 | 388 |  |
| Effective Diameter of Each Orifice—inch | 0.004 | 0.003 | 0.003 | 0.003 | 0.003. |
| Spray Temperature—°C | 75 | 84 | 70 | 72 | 80. |
| Spray Pressure—pounds per square inch, gage | 25 | 132 | 180 | 165 | 160. |
| Spray Rate—grams per minute | 240 | 60 | 83 | 68 |  |
| Spray Height—inches | 12 | 12 | 12 | 12 | 18. |
| Quantity of Hexane—grams | 8,000 | 6,500 | 6,500 | 6,500 | 5,000. |
| Weight Ratio of Hexane to Emulsion | 4:1 | 3.8:1 | 4.3:1 | 4.3:1 | 5:1. |
| Anti-Agglomerating Agent—composition | Corn Starch | Rice Starch | Modified Corn Starch. | Calcium Silicate. | Silicon Dioxide. |
| Temperature of Hexane—°C | −25 | −11 | −15 | −5 | −5. |
| Average Particle Size of Antiagglomeration Agent—microns | 20 | 8 | 20 | 0.5 | 0.01. |
| Percent by Weight of Antiagglomerating Agent to Emulsion | 7.0 | 34.0 | 5.0 | 2.0 | 0.5. |
| Particle Size Distribution of Gelatin Beadlets—Percent by weight: |  |  |  |  |  |
| +20 mesh (U.S. Screen Size) | 0 | 0 | 1.7 | 1.8 | 0.8. |
| 20 to 30 mesh | 7.1 | 0.3 | 6.4 | 6.4 | 15.9. |
| 30 to 40 mesh | 42.2 | 8.4 | 20.4 | 34.3 | 37.0. |
| 40 to 60 mesh | 44.0 | 80.3 | 69.0 | 56.7 | 42.9. |
| 60 to 80 mesh | 4.5 | 11.0 | 2.5 | 0.8 | 3.3. |
| 80 to 100 mesh | 1.4 | 0 | 0 | 0 | 0.1. |
| −100 mesh | 1.0 | 0 | 0 | 0 | 0. |
| Vitamin Potency—units per gram: |  |  |  |  |  |
| 30 to 40 mesh | 506,000 |  |  |  |  |
| 40 to 60 mesh | 454,000 | 530,000 | 538,000 | 591,000 | 328,500. |
| 60 to 80 mesh | 398,000 | 510,000 |  |  |  |
| Calculated Concentration of Antiagglomerating Agent in End Product—percent by weight: |  |  |  |  |  |
| 30 to 40 mesh | 10.65 |  |  |  |  |
| 40 to 60 mesh | 22.5 | 16.4 | 10.6 | 0.96 | Less than 0.2. |
| 60 to 80 mesh | 29.9 | 19.6 |  |  |  |

In Example 3 the modified starch employed as the anti-agglomerating agent is a corn starch which has been partially esterified according to the aforementioned U.S. Patent No. 2,613,206 and commercially available as "Dry-Flo" starch.

In each example a dry, free flowing, finely divided, solid, gelatin particle product was obtained without encountering substantial agglomeration of the particles from the point of their formation to the completion of the drying operation, which agglomeration would have ocbutylated hydroxytoluene were then added to the aqueous solution. The mixture was then emulsified by stirring at 65° C. until the average oil droplet size was about 3–7 microns. The resulting emulsion was found to have a Brookfield Viscometer viscosity at 45° C. of 200 centipoises.

The emulsion was then pumped continuously from the emulsion tank through a heat exchanger, whereat its temperature was raised to 75° C., through a filter of about 10 microns porosity and then through a sprayer of the type employed in Example 1–5. Hydrostatic pressure of the emulsion at the sprayer was about 400 pounds per square inch gage. Effective diameter of each orifice in the nozzle was 0.0025 inch. The cup face of the nozzle was dispersed about 12 to 18 inches above the surface of a slurry of 1,000 grams of hexane and 4 grams of finely divided colloidal silica having an average particle size of about 3 microns. Temperature of the slurry was −10° C.

The emulsion emerged from the sprayer into air in the form of jet streams. At about 12 inches from the cup face of the sprayer each stream disintegrated into droplets which fell into the cold slurry and immediately gelled into solid particles. When the emulsion had all been forced through the sprayer and all the droplets thereof had gelled, the hexane was removed from the solid particles by filtration. The filter cake was then air blown at about 70° C. until all of the moist, finely divided, solid, gelatin particles were dry. No agglomerated particles were found. Particle size distribution of the gelatin particle product on a weight percent basis was as follows:

| | |
|---|---|
| +30 mesh (U.S. Screen Size) | — |
| 30 to 40 | 5 |
| 40 to 60 | 30 |
| 60 to 80 | 40 |
| 80 to 100 | 15 |
| 100 to 120 | 8 |
| −120 mesh | 2 |

The gelatin particle product thus obtained had a vitamin A potency of about 250,000 units per gram.

EXAMPLE 7

The procedure of Example 6 was repeated except that instead of the 15.6 grams of vitamin A palmitate and 13.4 grams of edible tallow there were employed 31.2 grams of vitamin A palmitate (representing a potency of 1,600,000 units per gram). A non-agglomerated, dry, free flowing, finely divided, solid, gelatin particle product was obtained which had a vitamin A potency of about 500,000 units per gram and a particle size distribution similar to the product of Example 6.

EXAMPLE 8

This example illustrates the preparation, according to the process of this invention, of a dry, free flowing, finely divided, discrete, solid, gelatin particle product having both vitamin A activity and vitamin $D_2$ activity.

The procedure of Example 7 was repeated except that 0.25 gram of pure crystalline vitamin $D_2$ was added to the oil phase of the emulsion by incorporating the same into the melted solution of vitamin A palmitate, butylated hydroxy-anisole and butylated hydroxytoluene before the melted solution was added to the aqueous solution and dispersed therein. A non-agglomerated, dry, free flowing, solid, gelatin particle product was obtained which had a vitamin A potency of about 500,000 units per gram and a vitamin $D_2$ potency of about 100,000 units per gram. Particle size distribution of the product was similar to the product of Example 6.

EXAMPLE 9

The procedure of Example 8 was repeated except the quantity of pure crystalline vitamin $D_2$ added to the oil phase was increased to 1.25 grams. A non-agglomerated, dry, free flowing, solid, gelatin particle product was obtained which had a vitamin A potency of about 500,000 units per gram and a vitamin $D_2$ potency of about 500,000 units per gram.

EXAMPLE 10

This example illustrates the preparation of a dry, free flowing, finely divided, discrete, solid, vitamin E active, gelatin particle product according to the process of this invention, the anti-agglomerating agent being colloidal silica.

37.7 grams of 125 Bloom acid pig gelatin and 20.9 grams of glucose were dissolved over a period of approximately a half hour in 110 milliliters of water at 65° C. 58.6 grams of d-α-tocopheryl acetate, an oil, were then added to the warm aqueous solution and the mixture emulsified by stirring at 65° C. until the average oil droplet size was about 3 to 7 microns. The emulsion from this point on was treated in the same manner and under the same conditions as the emulsion involved in Example 6. A non-agglomerated, dry, free flowing, vitamin E active, solid, gelatin particle product was obtained which had a particle size distribution similar to that of the product of Example 6. The vitamin E active product had a vitamin E potency of about 700 International Units per gram.

Thus, an improved process is provided for making a dry, finely divided, free flowing, solid, unagglomerated gelatin particle product. By collecting the gelatin droplets and forming the solid gelatin particles in the cold slurry of congealing liquid and anti-agglomerating agent a number of advantages are realized.

One advantage of the anti-agglomerating agent in suspension in the congealing liquid resides in the fact that the quantity of solid gelatin particles, which can be collected in a unit volume of congealing liquid before a significant amount of agglomeration of the moisture ladened, solid, gelatin particles takes place is increased.

Another advantage of the anti-agglomerating agent in suspension in the congealing liquid is due to the efficient and effective distribution of anti-agglomerating agent even at minimum concentrations relative to the gelatin particles. Addition of anti-agglomerating agent to the moisture ladened, finely divided, solid, gelatin particles after separation of the particles from the congealing liquid and before subjecting the particles to air drying is not satisfactory. The reason is that the finer, finely divided anti-agglomerating agent, a powder, tends to ball up and become unevenly distributed so that localized or spot sticking or agglomeration of the gelatin particles occurs at the time of air drying.

Still another advantage of the process of this invention is that it permits minimum levels of antiagglomerating agent to be employed.

Yet another advantage of the process of this invention is the precise control it allows of the quantity of anti-agglomerating agent employed and thus the easy adjustment to changeable requirements.

Other advantages, features and embodiments of this invention will be apparent to those in exercise of ordinary skill in the art upon reading the foregoing disclosure. In this regard, all embodiments of this invention including variations and modifications thereof embracing the spirit and essential characteristics of this invention are within the scope of the claimed subject matter unless expressly excluded by claim language.

We claim:

1. In a process for making a dry, solid, gelatin particle product, wherein moisture ladened, solid, gelatin particles prepared from an aqueous solution of gelatin are formed in a congealing liquid in which gelatin is insoluble, which is inert under the conditions of this process and which consists essentially of a nonpolar, low boiling hydrocarbon, separated from the congealing liquid and dried, the improvement which comprises: mixing said moisture ladened particles while in said congealing liquid with a finely divided, solid, anti-agglomerating agent.

2. In a process for making a dry, finely divided, solid, gelatin particle product, wherein moisture ladened, finely divided, solid, gelatin particles prepared from an aqueous solution of gelatin are formed in a congealing liquid in which gelatin is insoluble, which is inert under the conditions of this process and which consists essentially of a nonpolar, low boiling hydrocarbon, separated from the congealing liquid and air dried, the improvement which comprises: mixing said moisture ladened particles while in said congealing liquid with a finer finely divided, solid, anti-agglomerating agent in sufficient quantity to establish and maintain substantially all of said gelatin particles in unagglomerated condition during the air drying thereof.

3. In a process for making a dry, finely divided, solid, gelatin particle product, wherein moisture ladened, finely divided, solid, gelatin particles of average particles size less than about a thousand microns and prepared from an aqueous solution of gelatin are formed in a congealing liquid in which gelatin is insoluble, which is inert under the conditions of this process and which consists essentially of a nonpolar, low boiling hydrocarbon, separated from the congealing liquid and air dried, the improvement which comprises: mixing said moisture ladened particles while in said congealing liquid with a finer finely divided, solid, anti-agglomerating agent of average particle size less than about 20 microns and in sufficient quantity to establish and maintain substantially all of said gelatin particles in unagglomerated condition during the air drying thereof.

4. In a process for making a dry, finely divided, solid, gelatin particle product, wherein moisture ladened, finely divided, solid, gelatin particles of average particle size less than about a thousand microns and prepared from an aqueous solution of gelatin are formed in a congealing liquid, selected from the group consisting of hexane, benzene, toluene, xylene, heptane, isoheptane and Stoddard solvent napthas, separated from the congealing liquid and air dried, the improvement which comprises: mixing said moisture ladened particles while in said congealing liquid with a finer finely divided, solid, anti-agglomerating agent of average particle size less than about 10 microns and in sufficient quantity to establish and maintain substantially all of said gelatin particles in unagglomerated condition during the air drying thereof.

5. A process for making a dry, free flowing, unagglomerated, solid, gelatin particle product, which comprises: preparing a warm aqueous solution of gelatin; forming said solution into droplets; introducing said droplets into a cold slurry consisting essentially of a congealing liquid in which gelatin is insoluble, which is inert under the conditions of this process and which consists essentially of a nonpolar, low boiling hydrocarbon, whereby said droplets gel and form moisture ladened, solid, gelatin particles, and a finely divided, solid, anti-agglomerating agent finer than said particles; mixing said moisture ladened gelatin particles with said slurry; separating gelatin particles from the congealing liquid; and drying the separated gelatin particles.

6. A process for making a dry, free flowing, finely divided, unagglomerated, solid, gelatin particle product, which comprises: preparing a warm aqueous solution of gelatin; forming said solution into droplets; introducing said droplets into a cold slurry consisting essentially of a congealing liquid in which gelatin is insoluble, which is inert under the conditions of this process and which consists essentially of a nonpolar, low boiling hydrocarbon, whereby said droplets gel and form moisture ladened, finely divided, solid, gelatin particles, and a finer finely divided, solid, anti-agglomerating agent; mixing said moisture ladened gelatin particles with said slurry; separating gelatin particles from the congealing liquid; and air drying the separated gelatin particles.

7. A process for making a dry, free flowing, finely divided, unagglomerated, solid, medicament containing, gelatin particle product, which comprises: preparing a warm aqueous solution of gelatin with a medicament therein; forming said solution into droplets; introducing said droplets into a cold slurry consisting essentially of a congealing liquid in which gelatin is insoluble, which is inert under the conditions of this process and which consists essentially of a nonpolar, low boiling hydrocarbon having a specific gravity less than that of said droplets, whereby said droplets gel and form moisture ladened, finely divided, solid, gelatin particles, and a finer finely divided, solid, anti-agglomerating agent; mixing said moisture ladened gelatin particles with said slurry; separating gelatin particles from the congealing liquid; and air drying the separated gelatin particles.

8. A process for making a dry, free flowing, finely divided, unagglomerated, solid, water-insoluble, medicament containing gelatin particle product, which comprises: preparing a warm aqueous solution of gelatin with a water-insoluble medicament dispersed therein; forming said solution into droplets; introducing said droplets into a cold slurry consisting essentially of a congealing liquid in which gelatin is insoluble, which is inert under the conditions of this process and which consists essentially of a nonpolar, low boiling hydrocarbon having a specific gravity less than that of said droplets, whereby said droplets gel and form moisture ladened, finely divided, solid, gelatin particles, and a finer finely divided, solid, anti-agglomerating agent; mixing said moisture ladened gelatin particles with said slurry; separating gelatin particles from the congealing liquid; and air drying the separated gelatin particles.

9. A process for making a dry, free flowing, finely divided, unagglomerated, solid, fat-soluble vitamin-active gelatin particle product, which comprises: preparing a warm aqueous solution of gelatin with a fat-soluble vitamin-active composition finely dispersed therein; forming said solution into droplets; introducing said droplets into a cold slurry consisting essentially of a congealing liquid, selected from the group consisting of hexane, benzene, toluene, xylene, heptane, isoheptane, and Stoddard solvent naphthas, whereby said droplets gel and form moisture ladened, finely divided, solid, gelatin particles, and a finer finely divided, solid, anti-agglomerating agent; mixing said moisture ladened gelatin particles with said slurry; separating gelatin particles from the congealing liquid; and air drying the separated gelatin particles.

10. A process for making a dry, free flowing, finely divided, unagglomerated, solid, fat-soluble vitamin active, gelatin particle product having an average particle size less than about a thousand microns, which comprises: preparing at a temperature in a range from about 20° C. to about 100° C. an aqueous solution of gelatin with a fat-soluble vitamin-active composition finely dispersed therein by admixing warm water and gelatin, whereby a solution is formed, and then admixing said fat-soluble vitamin-active composition into said solution until the maximum particle size of said composition dispersed in said solution is less than about 15 microns; forming said solution into droplets having an average size less than about a thousand microns; introducing said droplets into a cold slurry having a temperature in a range from about 15° C. to about −25° C. and consisting essentially of a congealing liquid, whereby said droplets gel and form moisture ladened, finely divided, solid, gelatin particles, and a finer finely divided, solid, anti-agglomerating agent having an average particle size less than about 20 microns; mixing said moisture ladened, gelatin particles with said slurry; separating gelatin particles from the congealing liquid; and air drying the separated gelatin particles.

11. A process for making a dry, free flowing, finely divided, unagglomerated, solid, fat-soluble vitamin active, gelatin particle product having an average particle size less than about a thousand microns, which comprises: preparing at a temperature in a range from about 20° C. to about 100° C. an aqueous solution of gelatin with a fat-soluble vitamin-active composition finely dispersed therein by admixing warm water and gelatin, whereby a solution is formed, and then admixing said fat-soluble vitamin-active composition into said solution until the maximum particle size of said composition dispersed in said solution is less than about 15 microns; forming said solution into droplets having an average size less than about a thousand microns; introducing said droplets into a cold slurry having a temperature in a range from about 15° C. to about −25° C. and consisting essentially of hexane, whereby said droplets gel and form moisture ladened, finely divided, solid, gelatin particles, and a finer finely divided, solid anti-agglomerating agent having an average particle size less than about 20 microns; mixing said moisture ladened, gelatin particles with said slurry; separating gelatin particles from the hexane; and air drying the separated gelatin particles.

12. A process according to claim 11 wherein said fat-soluble vitamin-active composition comprises vitamin A palmitate.

13. A process according to claim 11 wherein said fat-soluble vitamin-active composition consists essentially of vitamin A palmitate and crystalline vitamin $D_2$.

14. A process according to claim 11 wherein said fat-soluble vitamin active composition comprises d-α-tocopheryl acetate.

15. A process for making a dry, free flowing, finely divided, unagglomerated, solid, fat-soluble vitamin-active, gelatin particle product having an average particle size less than about a thousand microns, which comprises: preparing at a temperature in a range from about 20° C. to about 100° C. an aqueous solution of gelatin with a fat-soluble vitamin-active composition finely dispersed therein by admixing warm water and gelatin, whereby a solution is formed, and then admixing said fat-soluble vitamin active composition into said solution until the maximum particle size of said composition dispersed in said solution is less than about 15 microns; spraying said solution from a contricted orifice having an effective diameter in a range from about 0.001 inch to about 0.007 inch into a cold slurry having a temperature in a range from about 15° C. to about −25° C. and consisting essentially of a congealing liquid, selected from the group consisting of hexane, benzene, toluene, xylene, heptane, isoheptane, and Stoddard solvent napthas, whereby said droplets gel and form moisture ladened, finely divided, solid, gelatin particles, and a finer finely divided, solid anti-agglomerating agent having an average particle size less than about 20 microns; mixing said moisture ladened, gelatin particles with said slurry; separating gelatin particles from the congealing liquid; and air drying the separated gelatin particles.

16. A process for making a dry, free flowing, finely divided, unagglomerated, solid, fat-soluble vitamin-active, gelatin particle product having an average particle size less than about a thousand microns, which comprises: preparing at a temperature in a range from about 20° C. to about 100° C. an aqueous solution of gelatin with a fat-soluble vitamin-active composition finely dispersed therein by admixing warm water and gelatin, whereby a solution is formed, and then admixing said fat-soluble vitamin-active composition into said solution until the maximum particle size of said composition dispersed in said solution is less than about 15 microns; spraying said solution from a constricted orifice having an effective diameter in a range from about 0.001 inch to about 0.007 inch into a cold slurry having a temperature in a range from about 15° C. to about −25° and consisting essentially of a congealing liquid present at a weight ratio to said solution from about 4:1 to about 20:1, said congealing liquid being selected from the group consisting of hexane, benzene, toluene, xylene, heptane, isoheptane, and Stoddard solvent naphthas, whereby said droplets gel and form moisture ladened, finely divided, solid, gelatin particles, and a finer finely divided, solid anti-agglomerating agent having an average particle size less than about 20 microns present at a concentration of at least about one weight percent of said solution; mixing said moisture ladened, gelatin particles with said slurry; separating gelatin particles from the congealing liquid; and air drying the separated gelatin particles.

17. A process for making a dry, free flowing, finely divided, unagglomerated, solid, fat-soluble vitamin-active, gelatin particle product having an average particle size less than about a thousand microns, which comprises: preparing at a temperature in a range from about 20° C. to about 100° C. an aqueous solution of gelatin with a fat-soluble vitamin-active composition finely dispersed therein by admixing warm water and gelatin, whereby a solution is formed, and then admixing said fat-soluble vitamin-active composition into said solution until the maximum particle size of said composition dispersed in said solution is less than about 15 microns; spraying said solution from a constricted orifice having an effective diameter in a range from about 0.001 inch to about 0.007 inch into a cold slurry having a temperature in a range from about 15° C. to about −25° C. and consisting essentially of a hexane present at a weight ratio to said solution from about 4:1 to about 20:1, whereby said droplets gel and form moisture ladened, finely divided, solid, gelatin particles, and a finer finely divided, solid anti-agglomerating agent having an average particle size less than about 20 microns present at a concentration of at least about one weight percent of said solution; mixing said moisture ladened, gelatin particles with said slurry; separating gelatin particles from the hexane; and air drying the separated gelatin particles.

18. A process according to claim 17 wherein said anti-agglomerating agent is colloidal silica.

19. A process according to claim 17 wherein said anti-agglomerating agent is colloidal calcium silicate.

20. A process according to claim 17 wherein said anti-agglomerating agent is corn starch.

21. A process according to claim 17 wherein said anti-agglomerating agent is rice starch.

22. A process according to claim 17 wherein said anti-agglomerating agent is aerogel silicon dioxide.

23. A process according to claim 17 wherein said anti-agglomerating agent is a starch ester.

References Cited in the file of this patent

UNITED STATES PATENTS

| | | |
|---|---|---|
| 2,183,053 | Taylor | Dec. 12, 1939 |
| 2,756,177 | Cannalonga et al. | July 24, 1956 |
| 2,819,970 | Steigmann | Jan. 14, 1958 |
| 2,824,807 | Laster et al. | Feb. 25, 1958 |
| 2,834,683 | Corben et al. | May 13, 1958 |
| 2,851,364 | Peebles | Sept. 9, 1958 |
| 2,858,215 | Espoy | Oct. 28, 1958 |
| 2,876,160 | Schoch et al. | Mar. 3, 1959 |
| 2,897,119 | Dunn | July 28, 1959 |
| 2,977,203 | Sienkiewicz et al. | Mar. 28, 1961 |
| 2,987,444 | Allardice | June 6, 1961 |